United States Patent [19]

Berni

[11] 4,437,175
[45] Mar. 13, 1984

[54] MARINE SEISMIC SYSTEM

[75] Inventor: Albert J. Berni, Houston, Tex.

[73] Assignee: Shell Oil Company, Houston, Tex.

[21] Appl. No.: 323,631

[22] Filed: Nov. 20, 1981

[51] Int. Cl.$^3$ ........................... G01V 1/36; G01V 1/38
[52] U.S. Cl. ........................................ 367/24; 367/21;
367/49; 181/104
[58] Field of Search ....................... 367/15, 21, 24, 49;
181/104

[56] References Cited

U.S. PATENT DOCUMENTS

| 2,740,945 | 4/1956 | Hawes | 367/24 |
| 3,290,645 | 12/1966 | Pavey, Jr. et al. | 340/7 |
| 3,299,397 | 1/1967 | Paney et al. | 367/24 |
| 3,988,620 | 10/1976 | McDavid | 367/24 |
| 4,134,097 | 1/1979 | Cowles | 367/13 |
| 4,253,164 | 2/1981 | Hall | 367/21 |
| 4,345,473 | 8/1982 | Berni | 367/12 |

FOREIGN PATENT DOCUMENTS 2083221A  3/1982  United Kingdom .

Primary Examiner—Nelson Moskowitz

[57] ABSTRACT

A method of producing a seismic signal indicative of the substrata beneath a body of water comprising the steps of: supplying acoustic energy to the body of water; sensing at a predetermined depth the pressure wave reflected from the substrata beneath the body of water and the secondary pressure wave caused by a secondary reflection of the pressure wave from the air-water interface and generating a first signal indicative thereof; sensing at the predetermined depth the particle velocity of the water accompanying the pressure wave reflected from the substrata and the secondary pressure wave and generating a second signal indicative thereof; filtering the second signal such that portions of the second signal that have a frequency that is less than a first frequency are attenuated by the filtering to generate a third signal, the first frequency being less than a second frequency which is equal to the wave propagation velocity of the body of water divided by two times the predetermined depth; and combining the first and third signals to produce a signal indicative of the substrata beneath the body of water.

10 Claims, 2 Drawing Figures

MARINE SEISMIC SYSTEM

BACKGROUND OF THE INVENTION

This invention relates generally to seismic exploration of substrata beneath bodies of water and, more particularly, to a marine seismic system for sensing reflected seismic waves from such substrata.

Marine seismic exploration is usually conducted by towing a seismic streamer at a given depth through the ocean or other body of water. The streamer is provided with a plurality of pressure sensors, such as hydrophones, disposed at appropriate intervals along the length thereof. Acoustic wave energy is provided in the vicinity of the cable by an air gun or other suitable means; this wave energy travels downwardly through the earth with a portion of it being reflected upwardly at levels where there is a contrast in the acoustic impedance characteristics of the strata. The pressure sensors detect these primary pressure waves produced in the water by the upwardly traveling seismic reflectors and provide electric signals indicative thereof to suitable processing and recording equipment located on the seismic vessel that is towing the streamer. The pressure sensors also receive secondary pressure waves reflected from the surface of the water as a result of the mismatch in acoustical impedance at the air-water interface which may adversely affect the seismic signals. Nearly total cancellation of certain frequencies of the seismic signal may result, since the pressure wave undergoes a 180° phase shift when reflected at the air-water interface. The prior art, such as U.S. Pat. No. 3,290,645, has attempted to overcome this problem by employing both a pressure sensor and a particle velocity sensor. The output signals of the pressure sensor in response to the primary and secondary pressure waves have opposite polarity; whereas, the output signals of the particle velocity sensor have the same polarity for the primary and secondary waves. The prior art combines the pressure signals with the particle velocity signals to cancel the surface reflected wave front or ghost; however, it has been found that the mere combination of a pressure wave signal with a particle velocity signal may severely degrade the signal-to-noise ratio of the lower frequencies in the seismic band. This high noise level in the lower frequencies of the output of the particle velocity sensor is a function of the mounting of the particle velocity sensor and the geometry of the cable. Particle velocity sensors such as those disclosed in U.S. Pat. No. 3,281,768, which consist of either a particle displacement sensor in conjunction with a differentiating circuit or a particle acceleration sensor in conjunction with an integrating circuit may also be subject to the high noise levels.

Therefore, it is an object of the present invention to provide a marine seismic system that eliminates the adverse effects of the reflected, secondary pressure wave on the seismic signal and provides a good signal-to-noise ratio over the seismic band.

SUMMARY OF THE INVENTION

The present invention supplies acoustic energy to the body of water above the substrata to be seismically explored. The pressure wave reflected from the substrata beneath the body of water and the secondary pressure wave caused by a secondary reflection of that pressure wave from the air-water interface are sensed at a predetermined depth, and a first signal indicative thereof is generated. The particle velocity of the water accompanying the pressure wave reflected from the substrata and the secondary pressure wave are also sensed at the predetermined depth, and a second signal indicative thereof is generated. The second signal is filtered such that portions of the second signal that have a frequency that is less than a first frequency are attenuated by the filtering to generate a third signal, such first frequency being less than a second frequency, $f_2$, defined by the equation $f_2 = C/2D$, where C is the wave propagation velocity for the body of water and D is the predetermined depth. The filtered signal is combined with the first signal to produce a signal indicative of the substrata beneath the body of water. Preferably, the first frequency is not greater than about the second frequency minus 10 hertz and, more preferably, is about equal to 75% of the second frequency.

The frequency spectra associated with both the pressure wave and particle velocity signals exhibit periodic notches caused by the secondary reflections from the surface of the water. The notches in the pressure wave signals occur at multiples of the frequency defined by the wave propagation velocity of the body of water, which is approximately 1500 meters per second, divided by two times the depth of the detector. The notches in the particle velocity signals occur at frequencies midway between the notches in the pressure wave spectra. Thus, peaks in the particle velocity response occur at pressure wave notch frequencies and vice versa. It has been found that the particle velocity signal obtained, for example, by employing a particle acceleration sensor and an integrating circuit, has a low signal-to-noise ratio in the lower frequencies; however, the peak in the particle velocity signal which occurs at the pressure wave notch frequency has a high signal-to-noise ratio in comparison to the signal-to-noise ratio of the pressure wave signal. Accordingly, the present invention improves the signal-to-noise ratio over the seismic frequency band by adding the particle velocity signal to the pressure wave signal at the point at which the pressure wave signal has a low signal-to-noise ratio or notch. The present invention utilizes either a high-pass or passband filter to provide only the desired portion of the particle velocity signal, so that the lower frequencies of the pressure wave signal are not degraded by the mount and cable noise detected by the particle velocity sensor. The filter can be implemented by placing the appropriate resistances and capacitances in the seismic cable, or the pressure wave signal and the particle acceleration signal can be transmitted to the seismic vessel where the appropriate integrating, filtering, scaling and combination can be performed by a computer or other suitable electronic means.

Other objectives, advantages and applications of the present invention will be made apparent by the following detailed description of the preferred embodiments of the present invention.

DETAILED DESCRIPTION OF THE PREFERRED EMBODIMENTS

Figure 1:
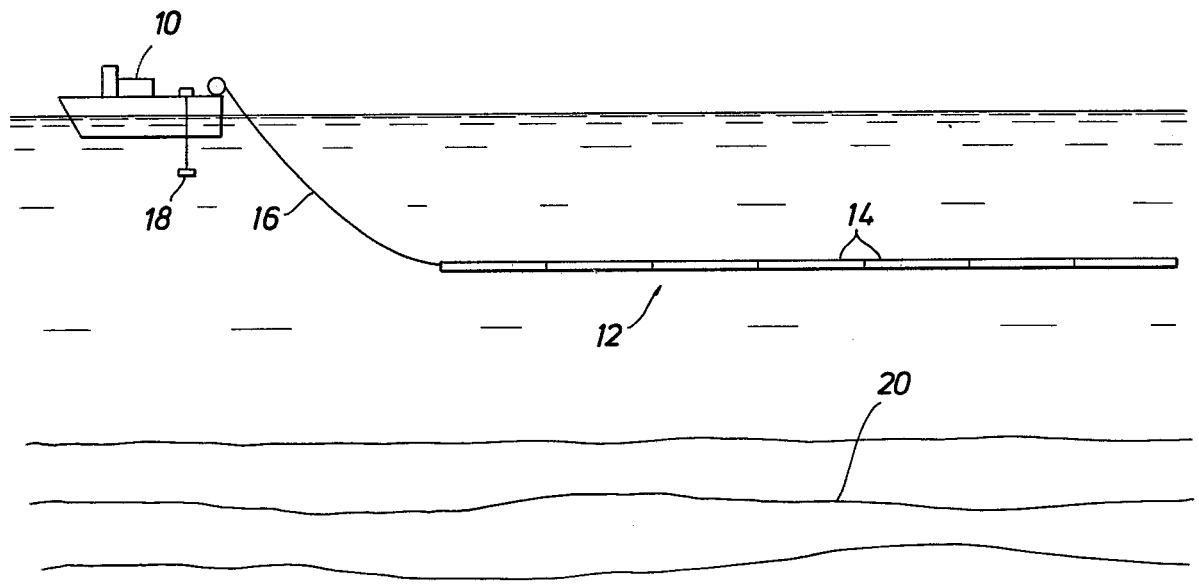
FIG. 1 is a diagramatic view of a seismic survey utilizing a marine streamer cable that is towed through the water behind a seismic vessel.

Referring to FIG. 1, a seismic exploration vessel 10 is shown towing a marine streamer cable 12 through a body of water located above the substrata that is to be seismically explored. Cable 12 can be quite lengthy, for example, about 2 miles, and is normally composed of a number of individual sections 14 connected end to end. The forward section of cable 12 is connected to vessel 10 by a typical lead-in section 16. Each section 12 contains a number of hydrophones (not shown) and accelerometers (not shown) that are positioned in each of sections 14 so that they are interspersed as is known in the art. Acoustic wave energy is provided in the vicinity of cable 12 by an air gun 18 or other suitable means. This wave energy travels downwardly through the earth with a portion of it being reflected upwardly at levels where there is a contrast in the acoustic impedance between layers of the strata, for example, at point 20. The hydrophones sense the acoustic pressure waves produced in the water by the upwardly traveling seismic reflections. The propagating wave front also causes movement of the water particles as it passes; the acceleration of the water particles is sensed by the accelerometers.

Figure 2:
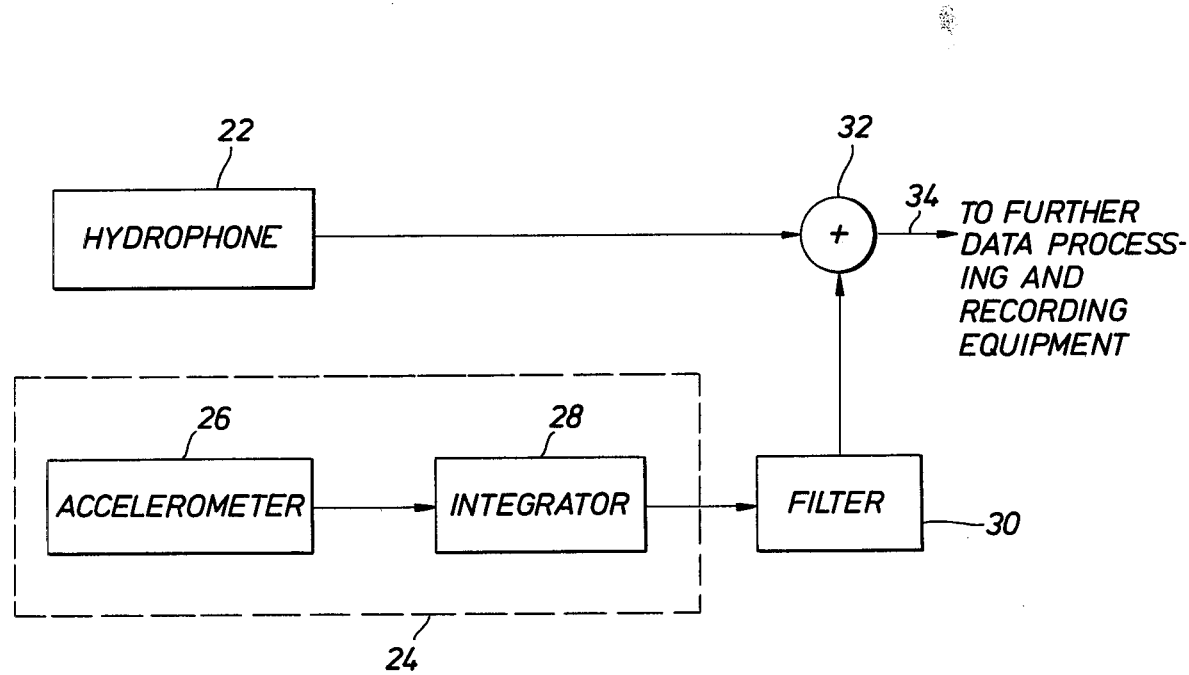
FIG. 2 is a schematic block diagram showing a seismic data acquisition system according to the present invention.

FIG. 2 illustrates a schematic block diagram of the seismic data acquisition system of the present invention. The primary pressure waves reflected from the substrata and the secondary pressure waves reflected from the air-water interface are detected by hydrophone 22. A sensor 24 for detecting the velocity of the water particles accompanying the primary and secondary pressure waves can comprise an accelerometer 26 connected to an integrator 28, or alternatively, sensor 24 can comprise either a particle velocity sensor or a particle displacement sensor connected to a differentiator. Accelerometer 26 must measure the vertical component of the particle acceleration for all orientations. Accelerometers that are axially symmetric, that is, their response is invariant only for rotations about their axis and are sensitive only to particle movements that are parallel to their axis are unsuitable, because the particle motion is predominantly vertical and the cable rotation causes the accelerometer axis to be nonvertical. One accelerometer that has been found suitable for use is the WH-1 accelerometer manufactured by Litton Resources System of Houston, Tex. Preferably, accelerometer 26 is mounted in a low-noise mount as disclosed in my U.S. patent application, Ser. No. 300,430, which was filed Sept. 8, 1981, and is assigned to a common assignee.

The output of integrator 28 is provided to filter 30. The output of filter 30 and hydrophone 22 are combined at node 32 and transmitted along conductor 34 of the cable to suitable processing and recording equipment located on the seismic vessel. Filter 30 may be a high-pass filter having a cutoff frequency below the notch frequency, $f_n$, of hydrophone 22, that is, the frequency at which the secondary pressure waves reflected from the air-water interface cause hydrophone 22 to have a poor signal-to-noise ratio. The notch frequency of hydrophone 22 occurs at the frequency defined by the equation $$f_n = C/2D$$

where C is the wave propagation velocity of the body of water through which hydrophone 22 is being towed and D is the depth at which hydrophone 22 is located. Preferably, the cutoff frequency is at least 10 hertz below the notch frequency and, more preferably, is at substantially 75% of the notch frequency. In any event, the limiting factor of the determination of the cutoff frequency is the point at which the signal-to-noise ratio of accelerometer 26 is worse than that of hydrophone 22, since the accelerometer signal would degrade the resolution of the hydrophone signal. If desired, filter 30 can be a passband filter with a passband range, for example, from the notch frequency minus 10 hertz to the notch frequency plus 10 hertz. It should be noted that generally the seismic equipment located on the seismic vessel, such as the DFS V System manufactured by Texas Instruments of Dallas, Tex., employs a high-pass filter to prevent aliasing. Nevertheless, a passband filter may be utilized with the present invention to prevent any degradation of the hydrophone signal in the event that the accelerometer signal has a poor signal-to-noise ratio in the higher frequencies of the seismic band. In an alternative embodiment, filter 30 can be included with the seismic equipment located on the seismic vessel, rather than being located in the cable. In this case the hydrophone signal and the integrated accelerometer signal are transmitted to the seismic vessel separately. The high-pass filtering of the accelerometer signal and the combination thereof with the hydrophone signal is performed externally to the cable by suitable processing equipment. Similarly, integrator 28 can also be located on the seismic vessel.

It is understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of producing a seismic signal indicative of the substrata beneath a body of water, said method comprising the steps of: supplying acoustic energy to said body of water; sensing at a predetermined depth the pressure wave reflected from said substrata beneath said body of water and the secondary pressure wave caused by a secondary reflection of said pressure wave from the air-water interface and generating a first signal indicative thereof; sensing at said predetermined depth the particle velocity of the water accompanying said pressure wave reflected from said substrata and said secondary pressure wave and generating a second signal indicative thereof; filtering said second signal such that portions of said second signal that have a frequency that is less than a first frequency are attenuated by said filtering to generate a third signal, said first frequency being less than a second frequency defined by the equation $$f = C/2D$$

where
  f: said second frequency,
  C: wave propagation velocity for said body of water, and
  D: said predetermined depth; and
combining said first and third signals to produce a signal indicative of said substrata beneath said body of water.

2. A method as recited in claim 1, wherein said first frequency is not greater than about said second frequency minus 10 hertz.

3. A method as recited in claim 1, wherein said first frequency is about equal to 75% of said second frequency.

4. A method as recited in claim 1, wherein said filtering step comprises using a passband filter having a passband range of at least from about said first frequency which is equal to said second frequency minus 10 hertz to a third frequency which is equal to said second frequency plus 10 hertz.

5. A method as recited in claims 1, 2 or 3, wherein said particle velocity sensing step comprises sensing the particle acceleration of the water accompanying said pressure wave reflected from said substrata and said secondary pressure wave and generating a signal indicative thereof, and integrating said particle acceleration signal.

6. An apparatus for producing a seismic signal indicative of the substrata beneath a body of water, said apparatus comprising: means for sensing at a predetermined depth a pressure wave reflected from said substrata beneath said body of water and the secondary pressure wave caused by a secondary reflection of said pressure wave from the air-water interface and generating a first signal indicative thereof; means for sensing at said predetermined depth the particle velocity of the water accompanying said pressure wave reflected from said substrata and said secondary pressure wave and generating a second signal indicative thereof; means for filtering said second signal such that portions of said second signal that have a frequency that is less than a first frequency are attenuated by said filtering means to generate a third signal, said first frequency being less than a second frequency defined by the equation $$f = C/2D$$

where
- f: said second frequency,
- C: wave propagation velocity for said body of water, and
- D: said predetermined depth; and means for combining said first and third signals to produce a signal indicative of said substrata beneath said body of water.

7. An apparatus as recited in claim 6, wherein said first frequency is not greater than about said second frequency minus 10 hertz.

8. An apparatus as recited in claim 6, wherein said first frequency is about equal to 75% of said second frequency.

9. An apparatus as recited in claim 6, wherein said filtering means is a passband filter having a passband range of at least from about said first frequency which is equal to said second frequency minus 10 hertz to a third frequency which is equal to said second frequency plus 10 hertz.

10. An apparatus as recited in claims 6, 7 or 8, wherein said means for sensing the particle velocity comprises means for sensing the particle acceleration of the water accompanying said pressure wave reflected from said substrata and said secondary pressure wave and for generating a signal indicative thereof, and means for integrating said particle acceleration signal.

* * * * *